United States Patent
Chen et al.

(10) Patent No.: US 12,291,164 B1
(45) Date of Patent: May 6, 2025

(54) MOTOR VEHICLE SEAT AND ADAPTIVE SEATBELT ADJUSTMENT

(71) Applicant: Adient (Chongqing) Automotive Components Co., Ltd., Chongqing (CN)

(72) Inventors: Zhiyong Chen, Chongqing (CN); Ming Zhang, Chongqing (CN); Ying Guan, Chongqing (CN); Yawei Liu, Chongqing (CN); Zhangneng Shi, Chongqing (CN)

(73) Assignee: ADIENT (CHONGQING) AUTOMOTIVE COMPONENTS CO., LTD., Huangmaoping (CN)

( * ) Notice: Subject to any disclaimer, the term of this patent is extended or adjusted under 35 U.S.C. 154(b) by 0 days.

(21) Appl. No.: 18/931,291

(22) Filed: Oct. 30, 2024

(30) Foreign Application Priority Data

Oct. 30, 2023 (CN) .......................... 202311423554.8

(51) Int. Cl.
*B60R 22/20* (2006.01)
*B60R 22/26* (2006.01)

(52) U.S. Cl.
CPC .............. *B60R 22/20* (2013.01); *B60R 22/26* (2013.01); *B60R 2022/207* (2013.01)

(58) Field of Classification Search
CPC ................................ B60R 22/20; B60R 22/26
See application file for complete search history.

(56) References Cited

U.S. PATENT DOCUMENTS

| | | | |
|---|---|---|---|
| 7,866,696 B2* | 1/2011 | Wang | B60N 2/42763 296/68.1 |
| 10,144,387 B1* | 12/2018 | Jaradi | B60R 22/1955 |
| 10,882,489 B2* | 1/2021 | Ohno | B60R 22/023 |
| 11,180,110 B2* | 11/2021 | Jaradi | B60R 22/26 |
| 11,827,175 B2* | 11/2023 | Reed | B60R 22/20 |
| 11,897,416 B2* | 2/2024 | Kim | B60R 22/03 |
| 12,097,821 B1* | 9/2024 | Nelakuditi | B60R 22/06 |
| 2024/0416865 A1* | 12/2024 | Nilsson | B60R 22/48 |

FOREIGN PATENT DOCUMENTS

WO WO-2018157016 A1 * 8/2018

* cited by examiner

*Primary Examiner* — Faye M Fleming
(74) *Attorney, Agent, or Firm* — Marshall & Melhorn, LLC

(57) ABSTRACT

A motor vehicle seat with adaptive seatbelt adjustment may have a chassis, a seat frame and a backrest. A rear end of the seat frame is rotatably connected to the chassis. A seat frame angle drive mechanism is provided between a front end of the seat frame and the chassis. The backrest is rotatably mounted at the rear end of the seat frame. The motor vehicle seat may also have a three-point seatbelt having a seatbelt guide component, a buckle and a lower anchor. The seatbelt guide component is fitted at a shoulder position on the backrest to be movable up and down by means of a lifting/lowering mechanism. The buckle and the lower anchor are fitted at two sides of the chassis, each by means of a front/rear adjustment mechanism, in such a way as to be slidable forwards and backwards.

10 Claims, 5 Drawing Sheets

MOTOR VEHICLE SEAT AND ADAPTIVE SEATBELT ADJUSTMENT

TECHNICAL FIELD

The present device relates to the field of motor vehicle seats, in particular to a motor vehicle seat with adaptive seatbelt adjustment.

BACKGROUND ART

As an indispensable safety component of motor vehicles, seatbelts have always played a key role in passenger protection. The main structure of a seatbelt includes a seatbelt retractor, a seatbelt guide component, a buckle and a lower anchor. The conventional way of installing a seatbelt is to have the seatbelt retractor and the seatbelt guide component mounted on the B-pillar of the motor vehicle in a fixed manner, with the buckle and the lower anchor mounted at the left and right sides of the seat in a fixed manner.

As people's living standards improve, they attach more and more importance to the enjoyment of life. Seats with zero-gravity mode functionality, i.e. zero-gravity vehicle seats, are a product that allows people to enjoy life. Through seat backrest angle adjustment, seat frame front-end tilt angle adjustment, and leg rest angle adjustment, zero-gravity vehicle seats offer passengers different experiences in terms of sitting positions or lying positions.

Zero-gravity seats offer passengers several ride modes, but conventional three-point seatbelts for motor vehicles are always mounted at fixed points, and the seat belt guide component, buckle and lower anchor cannot be adjusted. When a passenger is in a multi-angle sitting position mode, as the seat angle increases, the seatbelt will be in an unsafe and an uncomfortable wearing state. Furthermore, different passengers have different physiques, so even in a normal sitting position state, the seatbelt will still be in an unsafe and an uncomfortable wearing state.

SUMMARY

In view of the above, the present device provides a motor vehicle seat with adaptive seatbelt adjustment, with the aim of enabling the seatbelt to restrain a passenger at all times when the seat is in different sitting position modes and allowing the passenger to have a comfortable seatbelt wearing experience.

To achieve the above objective, the technical solution of the present device is as follows:

A motor vehicle seat with adaptive seatbelt adjustment may have a chassis, a seat frame arranged at an upper side of the chassis, and a backrest rotatably connected to a rear end of the seat frame. The chassis is configured to be connected to a motor vehicle floor, the rear end of the seat frame is rotatably connected to the chassis, and a seat frame angle drive mechanism is provided between a front end of the seat frame and the chassis. The motor vehicle seat further comprises a three-point seatbelt, having a seatbelt guide component, a buckle and a lower anchor. The seatbelt guide component is fitted at a shoulder position on the backrest in such a way as to be movable up and down by means of a lifting/lowering mechanism. The buckle and the lower anchor are fitted at two sides of the chassis, each by means of a front/rear adjustment mechanism, the front/rear adjustment mechanisms are used to drive the corresponding buckle and lower anchor to move forwards and backwards.

When the structure described above is used, the seatbelt is integrated on the motor vehicle seat, and three points of the seatbelt are all adjustable, enabling passengers with different physiques to wear the seatbelt comfortably. Furthermore, when a passenger is in different sitting position modes, the seatbelt can always restrain the passenger.

Preferably, the lifting/lowering mechanism comprises a first base, a first sliding component fitted on the first base in such a way as to be slidable up and down, and a first drive assembly for driving the first sliding component to slide up and down. The seatbelt guide component is fixedly mounted on the first sliding component, and the first base is fixedly mounted at a shoulder position on the backrest. When the structure described above is used, adjustment of the seatbelt guide component up and down can be achieved by the first drive assembly driving the first sliding component to slide up and down.

Preferably, the first base comprises an upper base and a lower base. The lower base is fixedly mounted at a shoulder position on the backrest. The upper base is fixedly mounted on the lower base by way of a screw. Upper and lower ends of the upper base have upward-bent first support plates. The two first guide rods are fixedly mounted between the two first support plates. Upper and lower ends of the first sliding component have downward-extending first sleeve-mounting plates. First sliding connection holes are provided in the first sleeve-mounting plates. The first guide rods are slidably fitted through the first sliding connection holes, and first bushings are mounted in the first sliding connection holes. When the structure described above is used, the sliding of a first slider on the first guide rods by means of the first bushings makes the sliding of the first sliding component smoother, and the sliding of the first sliding component enables the seatbelt guide component to be adjusted up and down.

Preferably, the first drive assembly comprises a first electric motor and a first lead screw joined to an output shaft of the first electric motor for motive power. The first electric motor is fixedly fitted at an outer side of one of the first support plates. Two ends of the first lead screw are rotatably supported on the two first support plates. The use of the structure described above guarantees a source of motive power for the first sliding component.

Preferably, the front/rear adjustment mechanism comprises a second base fixedly mounted at a side part of the chassis. A second sliding component is fitted on the second base in such a way as to be slidable forwards and backwards. A second drive assembly is for slidingly driving the second sliding component forwards and backwards. The buckle and the lower anchor are fixedly mounted on the corresponding second sliding components. When the structure described above is used, adjustment of the buckle and the lower anchor forwards and backwards can be achieved by the second drive assembly driving the second sliding component to slide forwards and backwards.

Preferably, the second base comprises an inner base and an outer base. The inner base is fixedly mounted at left and right sides of the chassis. the outer base is fixedly mounted at an outer side of the inner base by way of a screw. Front and rear ends of the outer base have outward-bent second support plates. Two second guide rods are fixedly mounted between the two second support plates. Front and rear ends of the second sliding component have inward-extending second sleeve-mounting plates. Second sliding connection holes are provided in the second sleeve-mounting plates. The second guide rods are slidably fitted through the second sliding connection holes. Second bushings are mounted in the second sliding connection holes. When the structure described above is used, the sliding of a second slider on the second guide rods by means of the second bushings makes the sliding of the second sliding component smoother, and the sliding of the second sliding component enables the buckle and the lower anchor to be adjusted forwards and backwards.

Preferably, the second drive assembly comprises a second electric motor and a second lead screw joined to an output shaft of the second electric motor for motive power. The second electric motor is fixedly fitted at an outer side of one of the second support plates. Two ends of the second lead screw are rotatably supported on the two second support plates. The use of the structure described above guarantees a source of motive power for the second sliding component.

Preferably, the first drive assembly comprises a first electric motor and a first synchronous belt. A first synchronous wheel is fitted round an output end of the first electric motor. A first directional wheel is provided on the first base. The first synchronous belt is fitted round the first synchronous wheel and the first directional wheel. The first sliding component is fixedly mounted at one side of the first synchronous belt. When the structure described above is used, adjustment of the seatbelt guide component up and down can be achieved by the first electric motor starting up and driving the first synchronous belt to rotate, and the rotation of the first synchronous belt driving the first sliding component to move up and down.

Preferably, the second drive assembly comprises a second electric motor and a second synchronous belt. A second synchronous wheel is fitted round an output end of the second electric motor. A second directional wheel is provided on the second base. The second synchronous belt is fitted round the second synchronous wheel and the second directional wheel. The second sliding component is fixedly mounted at one side of the second synchronous belt. When the structure described above is used, adjustment of the buckle and the lower anchor forwards and backwards can be achieved by the second electric motor starting up and driving the second synchronous belt to rotate, and the rotation of the second synchronous belt driving the second sliding component to move forwards and backwards.

Preferably, the seat frame angle drive mechanism has an angle adjuster motor. The angle adjuster motor and the front/rear adjustment mechanism use a first electric angle adjuster to drive the seat frame to rotate. A second electric angle adjuster is provided at a position of rotatable connection between the backrest and the seat frame. The lifting/lowering mechanism and the front/rear adjustment mechanism are driven by a first electric motor and a second electric motor respectively. The first electric angle adjuster, the second electric angle adjuster, the first electric motor and the second electric motor are all connected to a seat controller in an integrated manner.

Compared with the prior art, the present device has the following beneficial effects:
1. When the motor vehicle seat with adaptive seatbelt adjustment is used, adjustment of the seatbelt guide component up and down and adjustment of the buckle and the lower anchor forwards and backwards can be achieved by the drive assemblies driving the sliding components to move, such that in any sitting position mode, the seatbelt can always be adjusted to a relatively safe and comfortable position.
2. In contrast to a conventional three-point seatbelt mounting structure, three points of the seatbelt provided in the present device are all adjustable, thus ensuring optimal safety and comfort of passengers with different physiques when wearing the seatbelt.
3. The fact that the seatbelt is integrated on the motor vehicle seat ensures that, as the seat angle increases, the seatbelt's restraining action on the passenger will not be affected.

DETAILED DESCRIPTION

The present device is described further below with reference to embodiments and the drawings.

Figure 1:
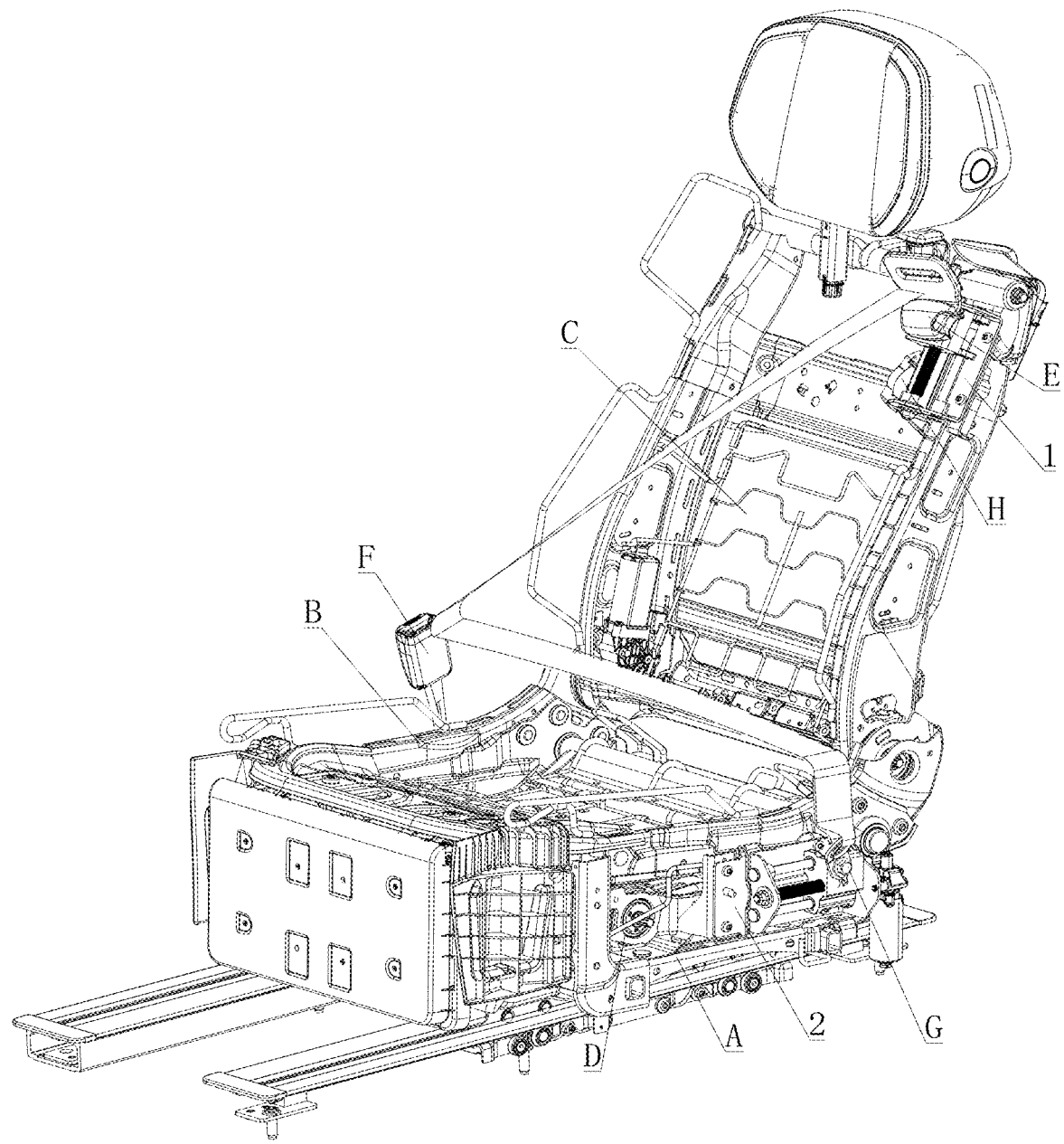
FIG. 1 is a 3D structural drawing of the seat in a normal sitting position mode.
Figure 2:
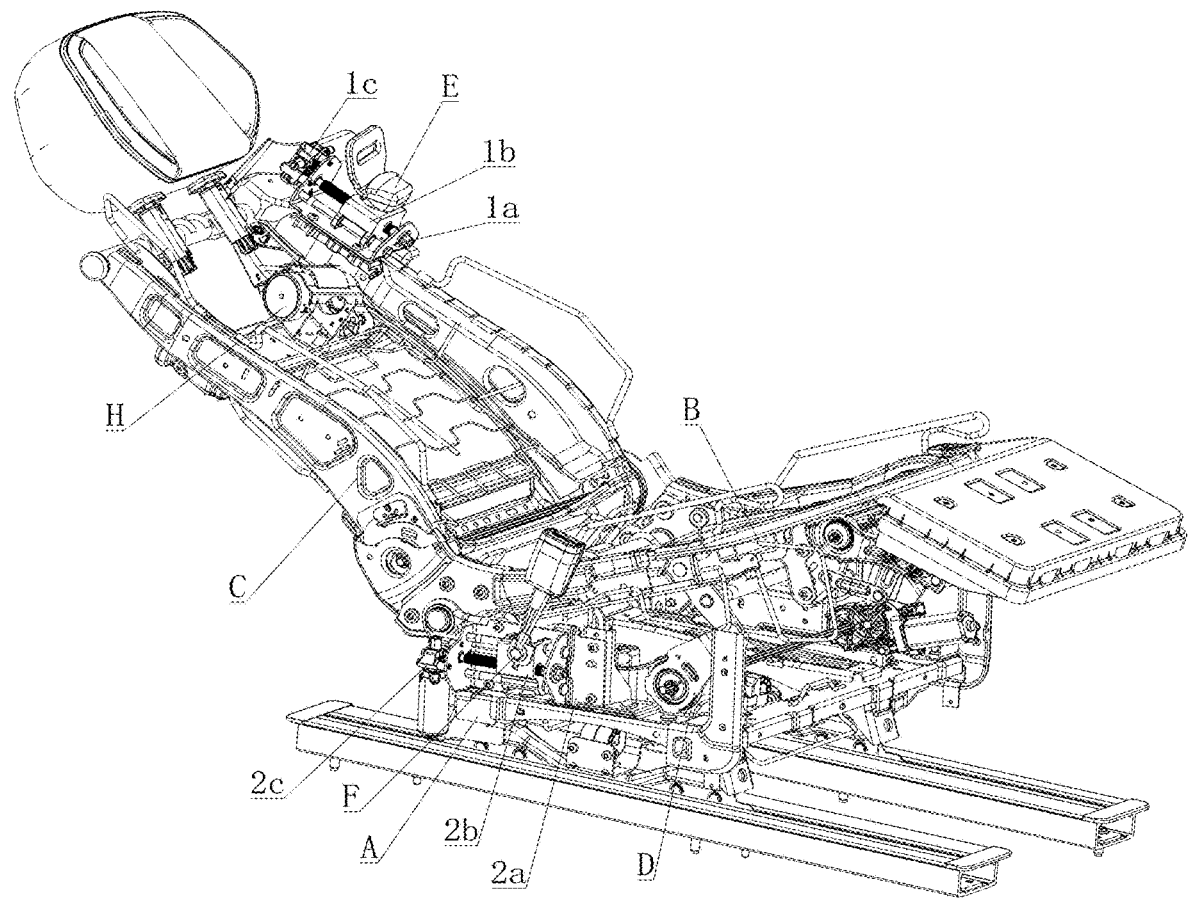
FIG. 2 is a 3D structural schematic drawing of the seat in zero-gravity mode.

As shown in FIGS. 1 and 2, a motor vehicle seat with adaptive seatbelt adjustment comprises a chassis A, a seat frame B and a backrest C. The chassis A is configured to be mounted on a motor vehicle bottom plate. A rear end of the chassis A is rotatably fitted to a rear end of the seat frame B. A seat frame angle drive mechanism D is provided at a front end of the chassis A and a front end of the seat frame B. The seat frame angle drive mechanism D is used to adjust an angle of the seat frame. The backrest C is rotatably mounted at a rear end of the seat frame B. The motor vehicle seat with adaptive seatbelt adjustment further comprises a three-point seatbelt, which mainly consists of a seatbelt guide component E, a buckle F, a lower anchor G and a seatbelt retractor H. The seatbelt guide component E is fitted at a shoulder position on the backrest C in such a way as to be movable up and down by means of a lifting/lowering mechanism 1. The buckle F and the lower anchor G are respectively fitted at left and right sides of the chassis A in such a way as to be movable forwards and backwards by means of a front/rear adjustment mechanism 2. The seatbelt retractor H is fixedly mounted at a shoulder rear-side position on the backrest C by way of a bolt. A seatbelt led out from the seatbelt retractor H slidably passes through the seatbelt guide component E, the lower anchor G and the buckle F in sequence. In this design, the three-point seatbelt is integrated on the zero-gravity seat, and three points of the seatbelt are all slidably adjustable, thus enabling passengers with different physiques to wear the seatbelt safely and comfortably. Furthermore, for different sitting position modes of the seat, by adjusting the three points of the seatbelt, it is possible to ensure that the passenger is comfortable and safe at all times when wearing the seatbelt.

As shown in FIG. 2, the lifting/lowering mechanism 1 mainly consists of a first base 1a, a first sliding component $1b$ and a first drive assembly $1c$. The first base $1a$ is fixedly mounted at a shoulder position on the backrest C by way of a bolt. The first sliding component $1b$ is mounted on the first base $1a$ in such a way as to be slidable up and down. The seatbelt guide component E is fixedly mounted on the first sliding component $1b$. The first drive assembly $1c$ is mounted between the first base $1a$ and the first sliding component $1b$, for driving the first sliding component $1b$ to slide back and forth on the first base $1a$. In this design, the first drive assembly $1c$ driving the first sliding component $1b$ to slide back and forth enables the seatbelt guide component E to be adjusted up and down.

Figure 3:
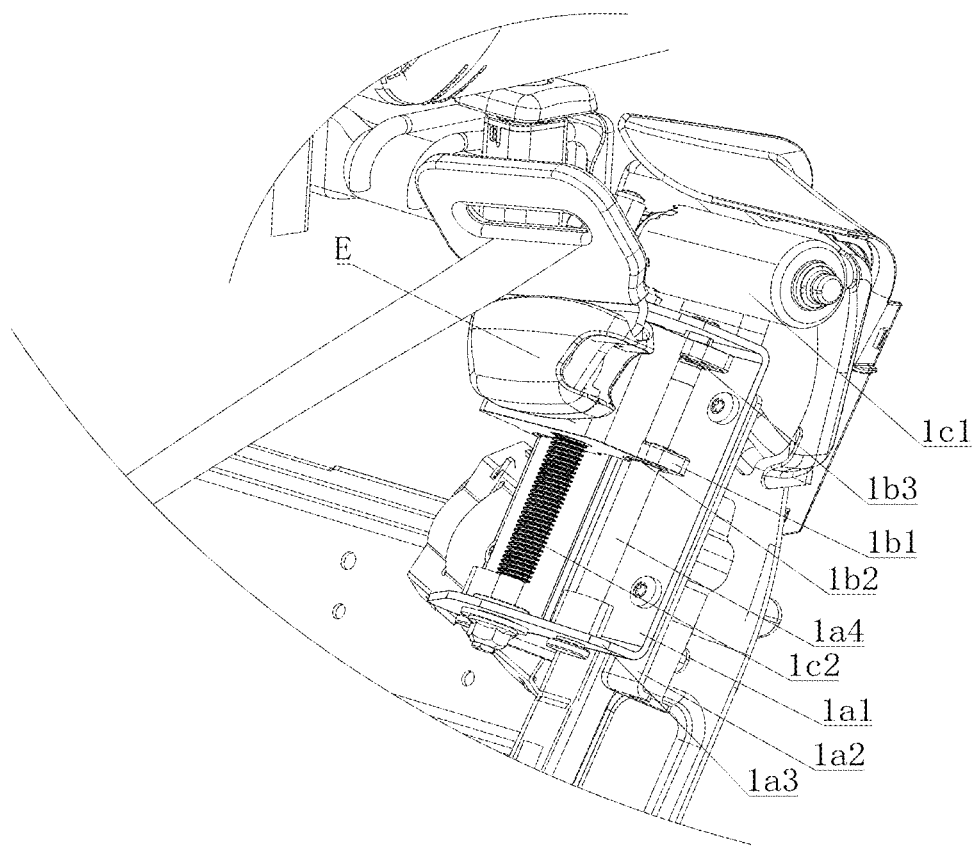
FIG. 3 shows a 3D structural drawing of the position of the seatbelt guide component.

FIG. 3 shows the specific structure of the lifting/lowering mechanism 1. The first base $1a$ consists of an upper base $1a1$ and a lower base $1a2$. The lower base $1a2$ is fixedly mounted at a shoulder position on the backrest C. The upper base $1a1$ is fixedly mounted on the lower base $1a2$ by way of a bolt. Upper and lower ends of the upper base $1a1$ have upward-bent first support plates $1a3$, making the upper base a U-shaped structure overall. Two first guide rods $1a4$ are fixedly mounted between the two first support plates $1a3$. The two first guide rods $1a4$ are arranged symmetrically at the left and right. Upper and lower ends of the first sliding component $1b$ have first sleeve-mounting plates $1b1$ extending towards the seat C. First sliding connection holes $1b2$ are provided in the first sleeve-mounting plates $1b1$. First bushings $1b3$ are mounted in the first sliding connection holes $1b2$, and the first guide rods $1a4$ pass through the first bushings $1b3$ in a wobble-free fit. In this design, the first sliding component $1b$ slides on the first guide rods $1a4$ by means of the first bushings $1b3$, and, consequently, the sliding of the first sliding component $1b$ is smoother.

Further, the first drive assembly $1c$ consists of a first electric motor $1c1$ and a first lead screw $1c2$. In this embodiment, the first electric motor $1c1$ is a gear motor. The first electric motor $1c1$ is fixedly mounted, by way of a bolt, at an outer side of the first support plate $1a3$ located at an upper end. The first lead screw $1c2$ is rotatably mounted between the upper and lower first support plates $1a3$. The first lead screw $1c2$ and the first sliding component $1b$ are fitted together by screw-threads. An upper end of the first lead screw $1c2$ and an output shaft of the first electric motor $1c1$ are joined together for motive power. In this design, a source of motive power for the first sliding component $1b$ is ensured, and, as the first electric motor $1c1$ is a gear motor, it has the advantages of having a simple structure and occupying little space.

Figure 4:
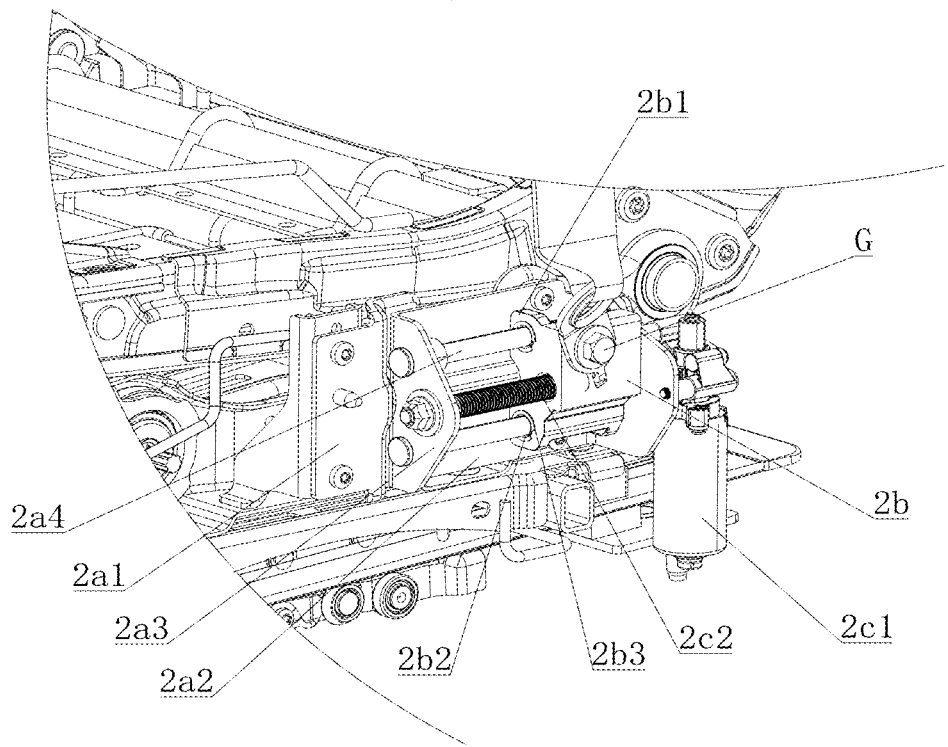
FIG. 4 shows a 3D structural drawing of the position of the seatbelt lower anchor.

As shown in FIGS. 2 and 4, the front/rear adjustment mechanism 2 mainly consists of a second base $2a$, a second sliding component $2b$ and a second drive assembly $2c$. In this embodiment, second bases $2a$ are fixedly mounted at left and right sides of the chassis A respectively. Two second sliding components $2b$ are slidably mounted on left and right second bases $2a$ respectively. The buckle F is fixedly mounted on one of the second sliding components $2b$, and the lower anchor G is fixedly mounted on the other second sliding component $2b$ corresponding to the buckle F. The second drive assembly $2c$ is mounted between the second base $2a$ and the second sliding component $2b$. The second sliding component $2b$ is driven by the second drive assembly $2c$ to slide back and forth on the second base $2a$. In this design, the second drive assembly $2c$ driving the second sliding component $2b$ to slide back and forth enables the buckle F and the lower anchor G to be adjusted forwards and backwards.

FIG. 4 shows a drawing of the specific structure of the front/rear adjustment mechanism 2 at the position of the lower anchor G. In this embodiment, since the left and right front/rear adjustment mechanisms 2 have the same structure, a drawing of the specific mechanism of the front/rear adjustment mechanism 2 at the position of the lower anchor G alone is shown. The second base $2a$ consists of an inner base $2a1$ and an outer base $2a2$. The inner base $2a1$ is fixedly mounted at left and right sides of the chassis A. The outer base $2a2$ is fixedly mounted at an outer side of the inner base $2a1$ by way of a bolt, and second support plates $2a3$ are bent away from the chassis A at front and rear ends of the outer base $2a2$, making the outer base $2a2$ a U-shaped structure. Two second guide rods $2a4$ are fixedly mounted between the front and rear bent second support plates $2a3$, the two second guide rods $2a4$ being arranged symmetrically one above the other. Front and rear ends of the second sliding component $2b$ have second sleeve-mounting plates $2b1$ extending towards the chassis A. Second sliding connection holes $2b2$ are provided in the second sleeve-mounting plates $2b1$. Second bushings $2b3$ are mounted in the second sliding connection holes $2b2$, and the second guide rods $2a4$ pass through the second bushings $2b3$ in a wobble-free fit. In this design, the second sliding component $2b$ slides on the second guide rods $2a4$ by means of the second bushings $2b3$, and, consequently, the sliding of the second sliding component $2b$ is smoother.

Further, the second drive assembly $2c$ consists of a second electric motor $2c1$ and a second lead screw $2c2$. In this embodiment, the second electric motor $2c1$ is a gear motor of elongated construction. The second electric motor $2c1$ is fixedly mounted longitudinally, by way of a bolt, at an outer side of the second support plate $2a3$ close to the backrest C side. The second lead screw $2c2$ is rotatably mounted between the front and rear second support plates $2a3$, the second lead screw $2c2$ and the second sliding component $2b$ are fitted together by screw-threads, and a rear end of the second lead screw $2c2$ and an output shaft of the second electric motor $2c1$ are joined together for motive power. In this design, a source of motive power for the second sliding component $2b$ is ensured, and, as the second electric motor $2c1$ is a gear motor, it has the advantages of having a simple structure and occupying little space.

Figure 5:
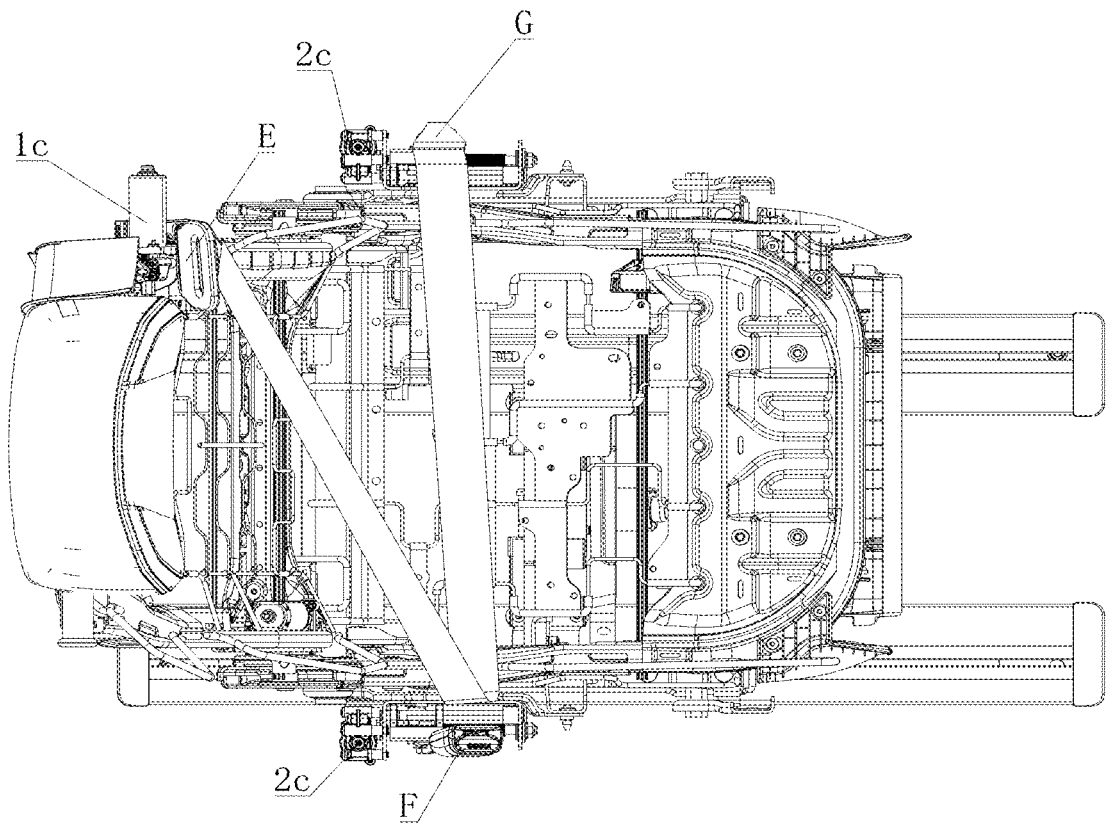
FIG. 5 is a top view of the seat in the normal sitting position mode.
Figure 6:
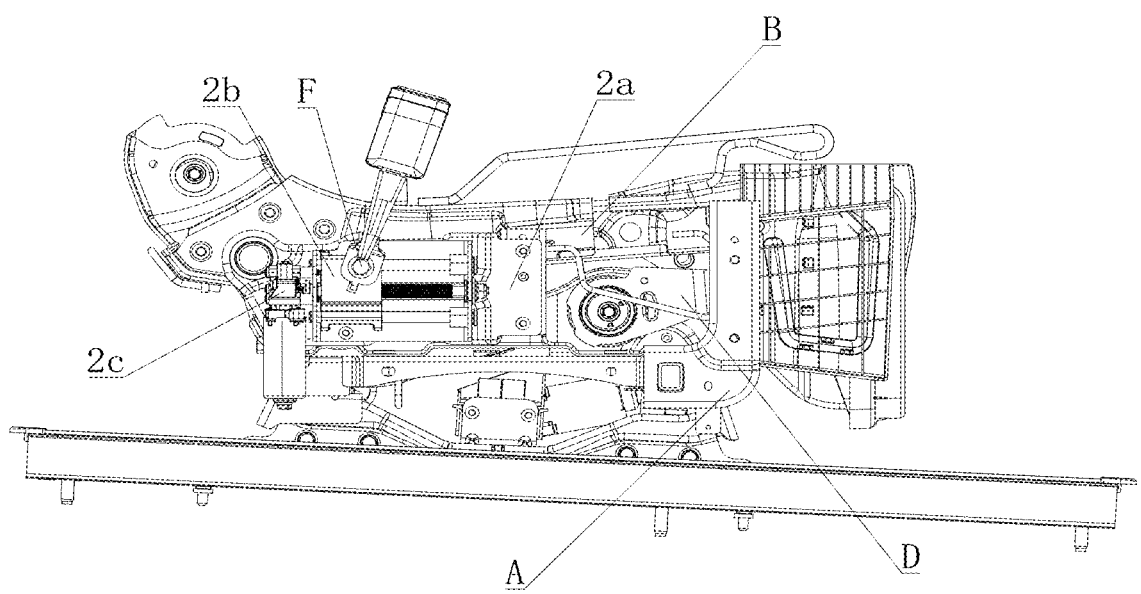
FIG. 6 is a left view of the seat in the normal sitting position mode (with the backrest C concealed).
Figure 7:
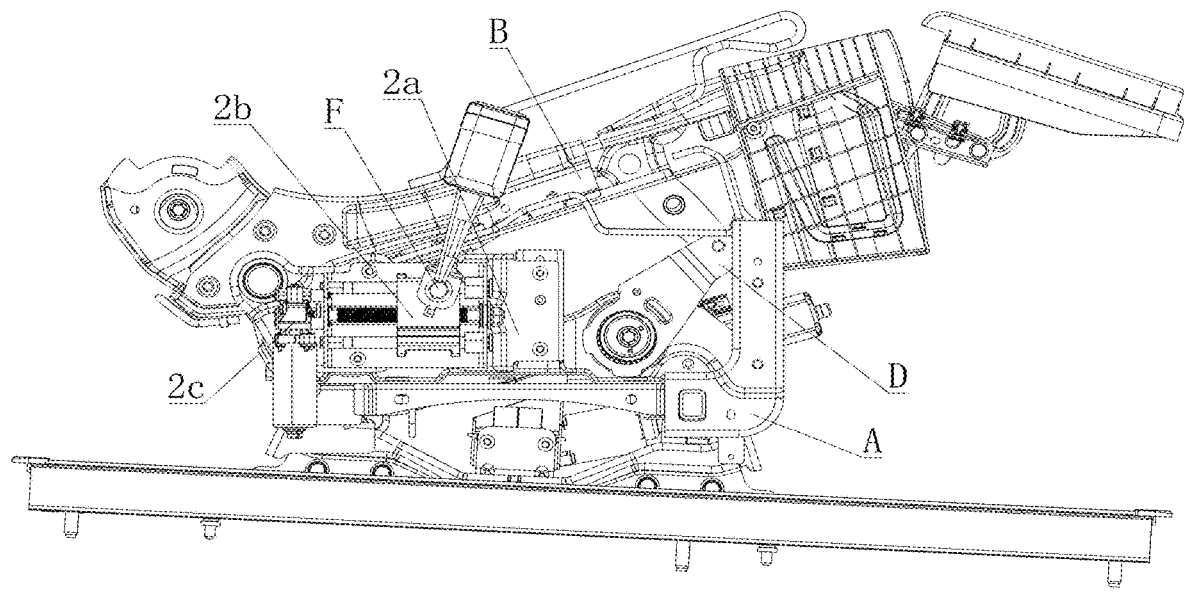
FIG. 7 is a left view of the seat in zero-gravity mode (with the backrest C concealed).

FIG. 5 shows a top view of the motor vehicle seat in a normal sitting position mode. In this embodiment, the buckle F and the lower anchor G are mounted symmetrically at the left and right. The second drive assemblies $2c$ are mounted longitudinally, and an overall width of the second drive assemblies $2c$ does not exceed a mounting width of the buckle F and the lower anchor G. With this design, the total space taken up by the motor vehicle seat is small, and the structure is more compact.

As shown in FIGS. 1, 2, 6 and 7, in this embodiment, the seat frame angle drive mechanism D has a first electric angle adjuster and a second electric angle adjuster. The first electric angle adjuster being used to drive adjustment of the angle between the seat frame B and the chassis A, and the second electric angle adjuster being used to drive adjustment of the angle between the backrest C and the seat frame B. The lifting/lowering mechanism 1 and the front/rear adjustment mechanism are driven by the first electric motor $1c1$ and the second electric motor $2c1$ respectively, and the first electric angle adjuster, the second electric angle adjuster. The first electric motor and the second electric motor are all connected to a seat controller in an integrated manner. Thus, as can be seen from FIGS. 1, 2, 6 and 7, when the motor vehicle seat is adjusted from the normal sitting position mode to zero-gravity mode, as the seat angle increases, the first sliding component $1b$ and the second sliding component 2b adaptively adjust downwards and forwards respectively. In this design, for different sitting position modes of the motor vehicle seat, the seatbelt can also adjust adaptively, so that the passenger remains safe and comfortable at all times when wearing the seatbelt.

Figure 8:
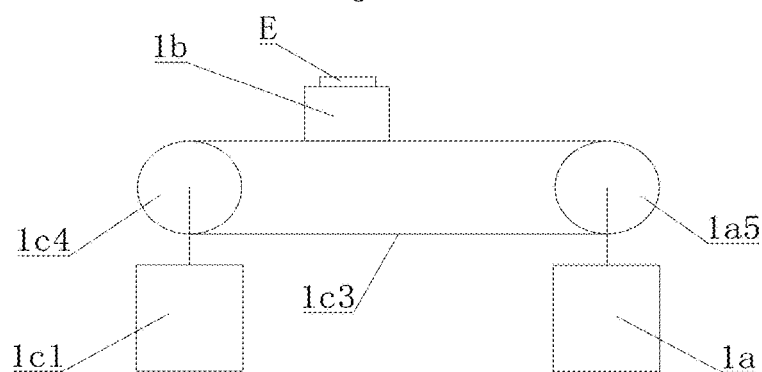
FIG. 8 is a schematic diagram of another implementation structure of the first drive assembly 1c of the present device.

As shown in FIG. 8, in addition to the lead screw electric motor driving method above, the first drive assembly 1c may also consist of the first electric motor 1c1 and a first synchronous belt 1c3. A first synchronous wheel 1c4 is fixedly fitted round an output end of the first electric motor 1c1. A first directional wheel 1a5 is fixedly mounted on the first base 1a. The first synchronous belt 1c3 is fitted round the first synchronous wheel 1c4 and the first directional wheel 1a5. The first sliding component 1b is fixedly mounted at one side of the first synchronous belt 1c3. The seatbelt guide component E is fixedly mounted on the first sliding component 1b. In this design, operation of the first electric motor 1c1 drives the first synchronous belt 1c3 to rotate through rotation of the first synchronous wheel 1c4, and the rotation of the first synchronous belt 1c3 drives the first sliding component 1b to move forwards and backwards, thereby realizing adjustment of the seatbelt guide component E up and down.

Figure 9:
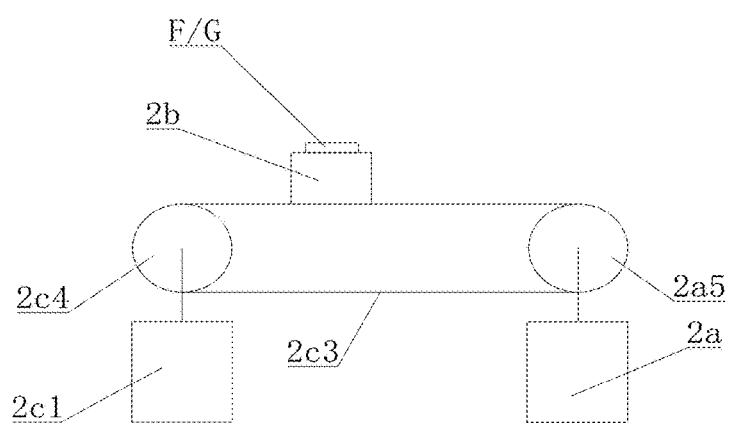
FIG. 9 is a schematic diagram of another implementation structure of the second drive assembly 2c of the present device.

As shown in FIG. 9, in addition to the lead screw electric motor driving method above, the second drive assembly 2c may also consist of the second electric motor 2c1 and a second synchronous belt 2c3. A second synchronous wheel 2c4 is fixedly fitted round an output end of the second electric motor 2c1. A second directional wheel 2a5 is fixedly mounted on the second base 2a. The second synchronous belt 2c3 is fitted round the second synchronous wheel 2c4 and the second directional wheel 2a5. The second sliding component 2b is fixedly mounted at one side of the second synchronous belt 2c3. The buckle F and the lower anchor G are fixedly mounted on the left and right second sliding components 2b respectively. In this design, operation of the second electric motor 2c1 drives the second synchronous belt 2c3 to rotate through rotation of the second synchronous wheel 2c4, and the rotation of the second synchronous belt 2c3 drives the second sliding component 2b to move forwards and backwards, thereby realizing adjustment of the buckle F and the lower anchor G forwards and backwards.

Finally, it should be explained that the description above is only of preferred embodiments, and those skilled in the art, enlightened by the foregoing, could make a variety of similar representations without going against the claims and purpose of the present device, all such changes falling within the scope of protection thereof.

What is claimed is:

1. A motor vehicle seat with adaptive seatbelt adjustment, comprising a chassis, a seat frame arranged at an upper side of the chassis, and a backrest rotatably connected to a rear end of the seat frame, the chassis being configured to be connected to a motor vehicle floor, the rear end of the seat frame being rotatably connected to the chassis, and a seat frame angle drive mechanism being provided between a front end of the seat frame and the chassis, wherein the motor vehicle seat further comprises a three-point seatbelt, having a seatbelt guide component, a buckle and a lower anchor;

the seatbelt guide component is fitted at a shoulder position on the backrest in such a way as to be movable up and down by means of a lifting/lowering mechanism;

the buckle and the lower anchor are fitted at two sides of the chassis, each by means of a front/rear adjustment mechanism, the front/rear adjustment mechanisms being used to drive the corresponding buckle and lower anchor to move forwards and backwards.

2. The motor vehicle seat with adaptive seatbelt adjustment as claimed in claim 1, wherein the lifting/lowering mechanism comprises a first base, a first sliding component fitted on the first base in such a way as to be slidable up and down, and a first drive assembly for driving the first sliding component to slide up and down; the seatbelt guide component is fixedly mounted on the first sliding component, and the first base is fixedly mounted at a shoulder position on the backrest.

3. The motor vehicle seat with adaptive seatbelt adjustment as claimed in claim 2, wherein the first base comprises an upper base and a lower base, the lower base being fixedly mounted at a shoulder position on the backrest, the upper base being fixedly mounted on the lower base by way of a screw, upper and lower ends of the upper base having upward-bent first support plates, and two first guide rods being fixedly mounted between the two first support plates; upper and lower ends of the first sliding component have downward-extending first sleeve-mounting plates, first sliding connection holes are provided in the first sleeve-mounting plates, the first guide rods being slidably fitted through the first sliding connection holes, and first bushings are mounted in the first sliding connection holes.

4. The motor vehicle seat with adaptive seatbelt adjustment as claimed in claim 2, wherein the first drive assembly comprises a first electric motor and a first lead screw joined to an output shaft of the first electric motor for motive power, the first electric motor being fixedly fitted at an outer side of one of the first support plates, and two ends of the first lead screw being rotatably supported on the two first support plates.

5. The motor vehicle seat with adaptive seatbelt adjustment as claimed in claim 1, wherein the front/rear adjustment mechanism comprises a second base fixedly mounted at a side part of the chassis, a second sliding component fitted on the second base in such a way as to be slidable forwards and backwards, and a second drive assembly for driving the second sliding component to slide forwards and backwards; and the buckle and the lower anchor are fixedly mounted on the corresponding second sliding components.

6. The motor vehicle seat with adaptive seatbelt adjustment as claimed in claim 5, wherein the second base comprises an inner base and an outer base; the inner base is fixedly mounted at left and right sides of the chassis; the outer base is fixedly mounted at an outer side of the inner base by way of a screw, front and rear ends of the outer base have outward-bent second support plates, two second guide rods are fixedly mounted between the two second support plates, front and rear ends of the second sliding component have inward-extending second sleeve-mounting plates, second sliding connection holes are provided in the second sleeve-mounting plates, the second guide rods being slidably fitted through the second sliding connection holes, and second bushings are mounted in the second sliding connection holes.

7. The motor vehicle seat with adaptive seatbelt adjustment as claimed in claim 5, wherein the second drive assembly comprises a second electric motor and a second lead screw joined to an output shaft of the second electric motor for motive power, the second electric motor being fixedly fitted at an outer side of one of the second support plates, and two ends of the second lead screw being rotatably supported on the two second support plates.

8. The motor vehicle seat with adaptive seatbelt adjustment as claimed in claim 2, wherein the first drive assembly comprises a first electric motor and a first synchronous belt; a first synchronous wheel is fitted round an output end of the first electric motor, a first directional wheel is provided on the first base, the first synchronous belt is fitted round the first synchronous wheel and the first directional wheel, and the first sliding component is fixedly mounted at one side of the first synchronous belt.

9. The motor vehicle seat with adaptive seatbelt adjustment as claimed in claim 5, wherein the second drive assembly comprises a second electric motor and a second synchronous belt; a second synchronous wheel is fitted round an output end of the second electric motor, a second directional wheel is provided on the second base, the second synchronous belt is fitted round the second synchronous wheel and the second directional wheel, and the second sliding component is fixedly mounted at one side of the second synchronous belt.

10. The motor vehicle seat with adaptive seatbelt adjustment as claimed in claim 1, wherein the seat frame angle drive mechanism uses a first electric angle adjuster to drive the seat frame to rotate; a second electric angle adjuster is provided at a position of rotatable connection between the backrest and the seat frame; the lifting/lowering mechanism and the front/rear adjustment mechanism are driven by a first electric motor and a second electric motor respectively; and the first electric angle adjuster, the second electric angle adjuster, the first electric motor and the second electric motor are all connected to a seat controller in an integrated manner.

\* \* \* \* \*